United States Patent [19]

Fallon, Jr. et al.

[11] 4,137,965
[45] Feb. 6, 1979

[54] WASTE HEAT RECOVERY SYSTEM

[75] Inventors: John J. Fallon, Jr., 1330 Sugarloaf Dr., Pasadena, Calif. 91103; Robert P. Cabeen, III, Glendale, Calif.

[73] Assignees: John J. Fallon, Jr., Pasadena; Donald Ritt, Sun Valley, both of Calif.

[21] Appl. No.: 798,122

[22] Filed: May 18, 1977

Related U.S. Application Data

[63] Continuation of Ser. No. 597,511, Jul. 21, 1975, abandoned.

[51] Int. Cl.² ............................................. F28D 15/00
[52] U.S. Cl. .......................................... 165/1; 165/11; 165/38; 165/107 R; 165/DIG. 12; 165/134 DP; 137/558; 236/91 F; 237/66; 122/504.2; 122/DIG. 1
[58] Field of Search ................... 165/107, 1, 11, 38, 165/DIG. 12, 134 DP; 122/504.2, DIG. 1; 137/558; 236/91 F; 237/66; 34/86

[56] References Cited

U.S. PATENT DOCUMENTS

| | | | |
|---|---|---|---|
| 1,500,838 | 7/1924 | Miller | 165/103 |
| 2,385,161 | 9/1945 | Pinkerton | 122/504.2 X |
| 2,948,516 | 8/1960 | Martinelli et al. | 165/134 X |
| 3,194,308 | 7/1965 | Harjed | 165/165 |
| 3,581,986 | 6/1971 | Magri | 236/91 F |
| 3,602,294 | 8/1971 | Wanson | 165/11 |
| 3,905,126 | 9/1975 | Villalobos et al. | 34/86 X |
| 3,958,101 | 5/1976 | Barabas | 165/107 X |
| 3,968,833 | 7/1976 | Strindehag et al. | 165/107 X |

FOREIGN PATENT DOCUMENTS

| | | | |
|---|---|---|---|
| 434112 | 7/1925 | Fed. Rep. of Germany | 165/66 |
| 204985 | 10/1928 | United Kingdom | 122/DIG. 1 |

*Primary Examiner*—Albert W. Davis, Jr.
*Attorney, Agent, or Firm*—Blakely, Sokoloff, Taylor & Zafman

[57] ABSTRACT

A system for recovering the waste heat normally exhausted into the atmosphere by chemical or other processing plants. The invented system comprises a heat exchange apparatus located in the exhaust stack or flue passage, heat transfer means for carrying the waste heat absorbed from the exhaust gases to a location remote therefrom, and a second heat exchange apparatus for releasing the transferred waste heat for beneficial use at said remote location. The present invention also includes temperature and pressure control means which enhance the safety and efficiency of the system's operation. The heat transfer means disclosed in this invention is a high temperature liquid (and associated pumping and piping means) capable of withstanding temperature up to 900 F. without flashing, changing state, or corroding the heat exchange apparatuses.

16 Claims, 1 Drawing Figure

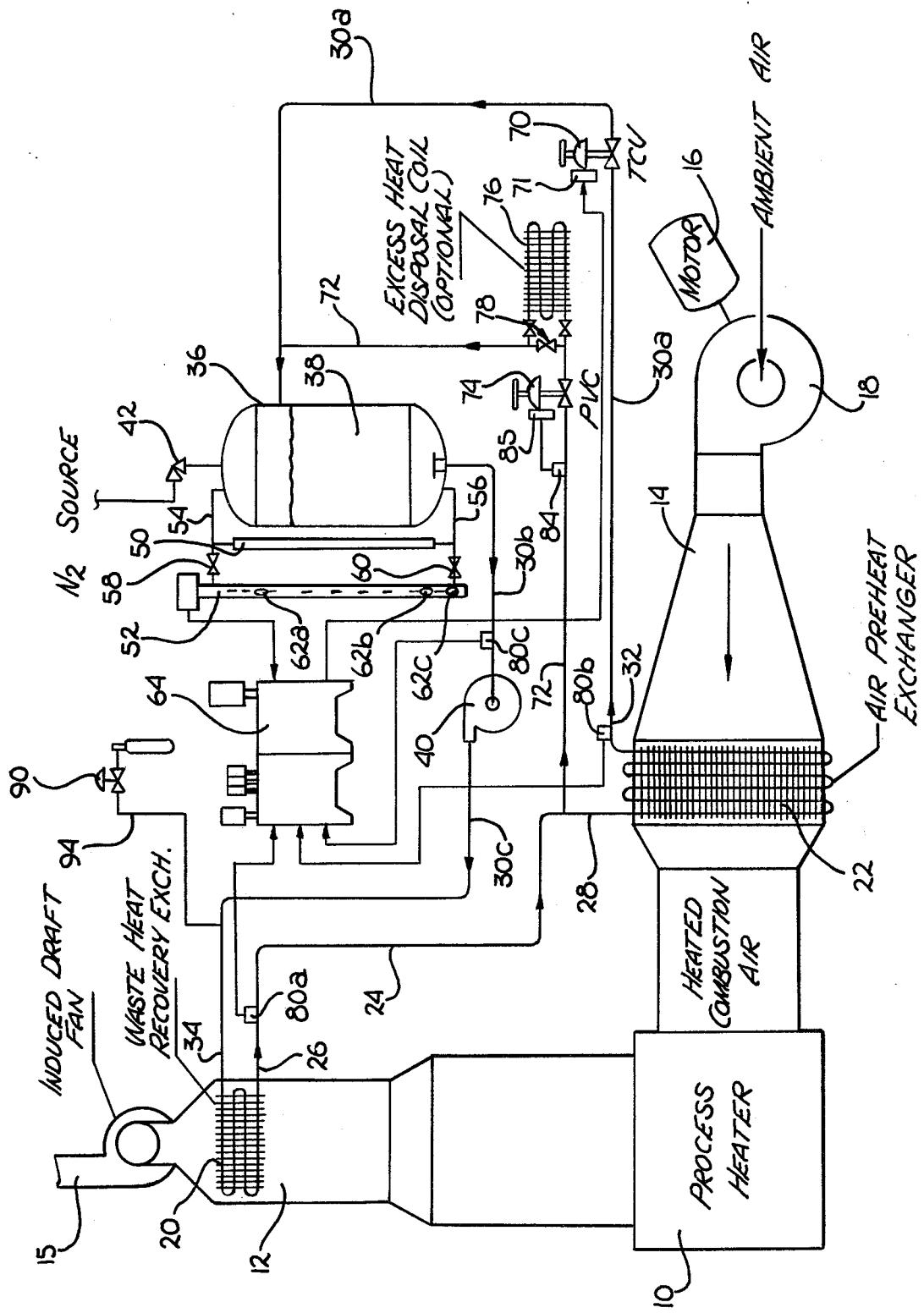

WASTE HEAT RECOVERY SYSTEM

This is a continuation of application Ser. No. 597,511, now abandoned filed July 21, 1975.

BACKGROUND OF THE INVENTION

1. Field of the Invention

This invention relates to means for recovering the waste heat generated in processing plants, and more particularly, to an improved waste heat recovery system for absorbing the waste heat contained in exhaust gases being discharged at one point and transferring it safely, efficiently, and economically to a second (remote) point for beneficial use in the process.

2. Prior Art

A substantial quantity of heat energy is generated as a by-product of many chemical and industrial processes. In many cases, this heat is exhausted into the atmosphere through exhaust stacks and flues because the cost of its recovery is greater than can be economically justified. This heat is known in the field as "waste heat" because it is, in fact, all too often wasted energy. Perhaps, twenty (20) years ago and earlier, an industrial society could afford to waste energy on a massive scale because the cost of one million BTU's of energy was only about 8 cents. Today, however, the cost of one million BTU's of energy is about $2.00. Thus, there exists today a great economic incentive to recover the waste heat of chemical and industrial processes and to use it beneficially in the process; e.g., to preheat inlet combustion air.

Waste heat recovery systems are known to the prior art. However, the systems of the prior art have one or more significant shortcomings and limitations. One waste heat recovery system well known and commonly used in the prior art utilizes the so-called Ljungstrom heat exchanger. The Ljungstrom heat exchanger is a regenerative heat exchanger in that it includes a regenerator drum rotatably mounted in a housing divided into separate compartments through which the hot exhaust gases and the cool gases to be heated flow. The drum, driven by an electric motor, has a capacity for heat absorption and release. As the drum rotates, it absorbs waste heat from the hot exhaust gases in one compartment and gives up the heat to the cooler gases in the other compartment.

The Ljungstrom heat exchanger imposes several severe limitations upon any waste heat recovery systems which utilizes it. In the first place, the regenerator drum must be relatively large in order for sufficient waste heat to be recovered. The large drum, in turn, requires the use of large exhaust and inlet compartments and associated ducts, the latter often 6 feet or larger in diameter. Secondly, by virtue of the use of a drum as the basic heat exchange medium, the two compartments of the housing must be located adjacent to one another. Thus, if the gases heated by the drum are to be used at a location remote from the location of the source of the waste heat gases, ducting must be provided between the exchanger and such remote point. Further, a blower of sufficient capacity must also be provided in order to force the heated gases to flow to the remote point of utilization. Thus, such regenerator drum systems suffer from the disadvantages of higher cost (due to the ducting and blower capacity required) and from the fact that they require relatively large installations which, together with the associated ducting, tie up much valuable property in a non-productive manner. For the foregoing reasons, a waste heat recovery system utilizing a Ljungstrom heat exchanger may prove to be economically unfeasible in some applications. In addition, such systems are typically more difficult to install than systems which use a fluid heat transfer medium, such as the present invention. In the latter case, 4 inch pipes are typically used in lieu of 6 foot or larger ducts. Another disadvantage of waste heat recovery systems which employ a Ljungstrom heat exchanger is that they are limited to transferring waste heat from hot exhaust gases to cooler combustion air.

Heat exchange apparatuses and methods are known in the prior art. Such apparatuses are generally used to transfer "process heat", as distinguished from waste heat, from one point in the process to another. Many such heat exchangers utilize a liquid heat transfer medium. However, the temperatures and other conditions present in a waste heat recovery application are typically far more severe than those encountered in applications wherein process heat is being transferred. Thus, a reliable and economically waste heat recovery system cannot be constructed by simply utilizing the heat exchanger apparatuses and methods of the prior art, suitable for the transfer of process heat, to solve a waste heat recovery problem.

U.S. Pat. No. 3,623,549, issued to Horace L. Smith, is an example of a prior art heat exchanger utilizing a plurality of heat transfer liquids. Smith's invention transfers heat from a gas at one location to a cooler gas at a second location which may be considerably removed from the first location. Smith discloses the use of at least two independent flow circuits through which different heat transfer liquids flow. Each flow circuit comprises a pair of interconnected finned tube type heat exchangers. The first heat exchanger of each circuit is located in a duct through which the hot gas flows, while the second is located in a duct through which the cool gas flows.

While U.S. Pat. No. 3,623,549 teaches the use of a suitable heat transfer liquid in closed flow circuits for the transfer of heat from one point to a second remote point, it applies such teachings to a general and relatively simple application of hot and cool gases flowing in two separate ducts. Smith's invention does not address itself to the particular conditions typically found in waste heat recovery applications where, for example, the temperatures and pressures at various points are critical parameters which must be controlled. To illustrate this point, the following two temperature constraints on waste heat recovery systems are cited: (i) the temperature of the heat transfer liquid must not reach a level which could damage the pumping means typically used in the flow circuit; (ii) the temperature of the exhaust gases must be permitted to drop to a temperature at which some of the gases may begin to condense onto the heat exchanger located in the exhaust stack, because such condensation would cause corrosion of the exchanger. If condensation of the exhaust gases is not prevented or substantially mitigated, the heat exchanger in the stack would have to be replaced periodically, thereby causing expense and down time in the operation of the process. Thus, the teachings of Smith are inadequate for the waste heat recovery applications for which the present invention is advantageously suited.

There have been attempts in the prior art to apply heat exchange apparatuses, utilizing a fluid as a heat transfer medium, for the recovery and transfer of waste heat. U.S. Pat. No. 2,699,758 issued to David Dalin et al., is an example of one such attempt. Dalin et al. disclose an apparatus for improving combustion in the furnaces of steam boilers by preheating the combustion air, in two stages, to a relatively high temperature by using the flue gases as a source of heat for this purpose. They teach the use of water as a first heat transfer medium in a first stage of waste heat recovery and superheated steam as the medium of heat transfer in the second stage thereof.

Unlike Smith, Dalin et al. disclose the use of some temperature and pressure control means; e.g., (i) an economizer 19 to insure a definite temperature differential between the two zones of the flue passage at which the heat exchangers draw their heat; (ii) a thermostatically controlled valve 34 which controls flow through a bypass pipe 33; and (iii) a thermally responsive control element 35 which controls the opening of the valve 34. However, the invention of Dalin et al. suffers from one of the major shortcomings of the prior art at the time of its invention (circa 1950); namely, the unavailability of heat transfer liquids suitable for the high temperatures encountered in waste heat recovery applications. Many of the heat transfer liquids of the prior art flash off at the high temperatures typically encountered in an exhaust stack, thereby creating a fire hazard; others tend to corrode the piping means through which they flow. While water and steam, as heat transfer mediums, do not flash off or cause as much corrosion as other liquids, they have their own disadvantages. Water, since it boils at 100 C, is inherently limited with respect to the amount of heat it can absorb without changing phase. On the other hand, steam, especially superheated steam, introduces the obvious disadvantages of high pressure; for example, severe design requirements with respect to the structural strength of the heat exchange apparatus and associated piping, and (ii) maintenance problems with respect to the detection and repair of leaks.

Still another disadvantage of the Dalin system, attributable to its use of superheated steam as the heat transfer medium, is the limitation that the latter imposes with respect to the distance between the flue passage (or exhaust stack) and the place to which the waste heat is to be delivered. If the distance is great enough, the continuing loss of heat through the conducting pipes may cause the superheated steam to condense to water. As a result of the heat transfer medium being in two phases within the flow circuit (i.e., steam and condensed water), its flow becomes non-uniform difficult to regulate. If the flow of the heat transfer medium cannot be readily regulated, the control of critical temperatures within the system becomes more difficult, if not impossible.

U.S. Pat. Nos. 3,405,509 and 3,405,759 disclose means for recovering waste heat in the exhaust stack of fired oil field equipment. The invention disclosed in U.S. Pat. No. 3,405,509 is limited in that it uses, as the heat transfer medium, the very oil well product fluids, (e.g., a mix of oil and water) which are being processed. U.S. Pat. No. 3,405,759 likewise teaches the use of the process liquid as the heat transfer medium. However, the latter patent also teaches the use of a separate heat transfer fluid contained in a source separate from the the process fluids; in the latter connection, however, the patent teaches the use of water and steam as the separate heat transfer fluid, both of which have the disadvantages and limitations described above with reference to U.S. Pat. No. 2,699,758 (Dalin et al.).

The present invention overcomes the shortcomings and limitations of waste heat recovery systems of the prior art. By utilizing a heat transfer fluid which is superior to water and steam, this invention enables waste heat to be recovered and transferred to remote locations without the need for large ducts and blowers, as is the case with the Ljungstrom exchanger; without the problems of high pressure as is the case with superheated steam; and without the limitation of low heat transfer capacity in the low pressure range, as is the case with water. Thus, the present invention is advantageous with respect to both the cost and case of installation and maintenance. Moreover, its installation does not tie up large areas of property in a non-productive utilization. In addition to being cost effective, this invention includes the critical temperature and pressure control means required for the effective and safe recovery of waste heat.

While the individual elements which comprise the present invention are each known in the prior art, there has heretofore been no waste heat recovery system which combines in one structure all the features and advantages found in this invention.

BRIEF SUMMARY OF THE INVENTION

The present invention comprises a pair of heat exchangers interconnected by suitable conduits, serial pumping means, a reservoir for storing a heat transfer fluid and temperature and pressure control means. The heat exchangers, conduits, pump and reservoir define a closed flow circuit within which the heat transfer fluid circulates. The first heat exchanger is located in an exhaust stack or flue passage of the processing equipment from which waste heat is to be recovered. The second heat exchanger is located at some point remote from the exhaust stack where the recovered heat is to be transferred to combustion air, a process gas or liquid, for some beneficial purpose. The heat transfer liquid is the medium which absorbs waste heat from the exhaust gases and carries it to the remote location for release to the combustion air, process gas or liquid. This invention also includes temperature and pressure control means, as well as certain means to ensure the safety of its operation.

Other objects novel features and advantages of the present invention will become apparent upon making reference to the following detailed description and the accompanying drawing. The description and the drawing will also further disclose the characteristics of this invention, both as to its structure and its mode of operation. Although a preferred embodiment of the invention is described hereinbelow, and shown in the accompanying drawing, it is expressly understood that the description and drawing thereof are for the purpose of illustration only and do not limit the scope of this invention.

BRIEF DESCRIPTION OF THE DRAWING

In the accompanying drawing, in which a preferred embodiment of the present invention is illustrated:

FIG. 1 is a schematic representation of the invented system installed within a processing system.

DETAILED DESCRIPTION OF THE INVENTION

The present invention is installed in, and operates in conjunction with, functionally independent process equipment of one kind or another. In the embodiment of the invention described herein, such process equipment includes a process heater 10, an exhaust stack 12, and an inlet duct 14 for conducting "combustion" air to the process heater 10. A motor 16 is typically used to operate a blower 18 at the front end of inlet duct 14. At the exhaust end, a fan 15 is often utilized to induce an exhaust draft.

The present invention comprises the following basic elements: (i) a first heat exchanger 20, preferably of the conventional finned coil type, installed within the exhaust stack 12 and adapted to recover waste heat from the hot exhaust gases flowing therethrough; (ii) a second heat exchanger 22, also of the conventional, finned coil type, installed within the inlet duct 14 and adapted to release the recovered waste heat to the cooler incoming combustion air flowing therethrough; (iii) conduit 24 which interconnects the outlet side 26 of recovery heat exchanger 20 with the inlet side 28 of air preheat exchanger 22; (iv) serial conduits 30a, 30b, and 30c which interconnect the outlet side 32 of air preheat exchanger 22 with the inlet side 34 of recovery heat exchanger 20; (v) a reservoir 36 for storing a heat transfer liquid 38 which circulates between heat exchangers 20 and 22; (vi) a pumping means 40 for forcing the circulation of heat transfer liquid 38 through the flow circuit defined by the heat exchangers 20 and 22, the reservoir 36 and conduits 24 and 30; and (vii) various temperature and pressure control means described more fully below.

While the present invention is being described with reference to an application for preheating incoming combustion air with recovered waste heat, it should be understood that the invention is not so limited, and that the recovered waste heat may be utilized beneficially in other ways in the process. In addition, while the embodiment being described comprises coil type heat exchangers, other suitable heat exchangers through which a heat transfer fluid flows may be utilized. Persons skilled in the art would have the capability of selecting the appropriate type of heat exchanger for any particular application.

In this embodiment the reservoir 36 is a pressure vessel in which approximately 25 pounds per square inch gauge (psig) of nitrogen is maintained. A nitrogen source is connected to reservoir 36 and the pressure is controlled by a valve 42. The purpose of the nitrogen gas is to provide an inert atmosphere within reservoir 36 and throughout the flow circuit generally, in order to prevent undesired oxidation of the heat transfer liquid 38.

In recent years, the chemical industry has developed superior heat transfer liquids capable of operating at extreme temperatures from as low as −80° up to 900° F. Such liquids include o-dichlorobenzene, diphenyl-diphenyloxide eutectic, di-aryl ethers and tri-aryl ethers sold by Dow Chemical Company under the trademark "Dowtherm" and hydrogenated terphenyls, and polychlorinated biphenyl and polyphenyl ether sold by the Monsanto Company under the trademark "Therminol". Other suitable heat transfer liquids are alkyl-aromatic petroleum oil, sold by Socony Mobil Oil Co. under the mark "Mobiltherm"; alaphatic petroleum oil sold by Exxon under the mark "Humbletherm"; and a good grade, pure lubricating oil. Any of these products would be suitable for most applications in which the present invention has utility. These preferred heat transfer liquids do not become too viscous for controllable flow at the low temperatures nor do they tend to flash at the high temperatures. Thus, they enable the invented system to be used in a wide range of applications.

Pumping means 40 may be any conventional pump, such as a centrifical fluid pump, capable of circulating the heat transfer liquid 38 under pressure. Pumping means 40, in this embodiment, is located serially in the flow path defined by conduit 30b and 30c.

In operation, heat transfer fluid 38 circulates in the flow circuit defined by the heat exchangers 20 and 22, the reservoir 36 and conduits 24 and 30. At the same time, the very hot exhaust gases produced by the process heater 10 are being drawn out through the exhaust stack 12 by the draft fan 15 or by natural convection. These hot gases pass through the coils of waste heat recovery exchanger 20, wherein the circulating heat transfer liquid 38 absorbs some of the waste heat energy. In a typical application, the temperature of the exhaust gases is about 550° F and as high as 900° F when leaving the process heater 10. The flow rate of heat transfer liquid 38 is set so as to remove the desired amount of waste heat from the exhaust gases, but not so much heat as to cool the gases below a temperature at which any of them may begin to condense upon the waste heat recovery exchanger 20. Such condensation will generally cause corrosion of the heat exchanger, thereby decreasing its heat transfer coefficient as well as its useful life.

In an appropriately designed embodiment of this invention, sufficient waste heat may be recovered from exhaust gases emanating from the process heater 10 at 550° to 900° so as to reduce their temperature to as low as 350° or lower, when flue gas quality permits, before their discharge into the atmosphere. Generally, 350° F would be the minimum temperature permissible in order to preclude the condensation of most waste gases containing oxides of sulfur.

The temperature and flow rate of the heat transfer liquid 38 which passes through waste heat recovery exchanger 20 varies with the amount of heat energy absorbed. This is a function of two inter-related heat balances, one between the heat transfer liquid and the source of the waste heat, and the second between the heat transfer liquid and the recipient of the waste heat. The inner diameters of conduits 24 and 30, in turn, are determined by the resultant flow rate. The size of the heat exchangers, the capacity of pumping means 40 and the settings of the various pressure and temperature control means described below are determined by the amount of heat recovered, the logarithmic mean temperature and overall heat transfer rate determined by the above heat balances and resultant heat transfer liquid flow rate. In any event, the heated liquid 38 is circulated to air preheat exchanger 22. In the typical application being described herein, the temperature of heat transfer liquid 38 at the inlet 28 of exchanger 22 would be about 450° F. Meanwhile, relatively cold ambient air is drawn into duct 14 by means of motor 16 and blower 18. The temperature of the inlet air is typically in the range from 30° F to 70° F. Within the duct 14, the air flows through the coils of air preheat exchanger 22, where it absorbs recovered waste heat from heat transfer liquid 38. As a result of the transfer of waste heat, the inlet air temperature, in this application, would increase to about 400° F – 410° F. As a result of using preheated air for combustion, the efficiency of combustion in the process heater 10 may be significantly increased.

Various control means are contemplated by the present invention to ensure its safe and efficient operation. These are now described in detail. Firstly, the liquid reservoir 36 utilizes float detection and correction means comprising a conventional gauge glass 50 and a limit switch assembly 52. The gauge glass 50 is vertically disposed and is coupled, via conduits 54 and 56, to the uppermost and lowermost ends of the reservoir 36 respectively. As known to those in the field, the gauge glass enables a visual determination of the level of the liquid 38 with the reservoir 36.

The limit switch assembly 52 is comprised of (i) a vertical tube adapted to receive heat transfer liquid 38 from the reservoir 36 through conduits 54 and 56 and control valves 58 and 60 respectively, and (ii) three electrical float switches 62a, 62b, and 62c located at three different levels therein. The float switches 62 are responsive to the level of the heat transfer liquid 38 in the vertical tube and, therefore, in the reservoir 36. Thus, the uppermost switch 62a is adapted to be activated when and if the level of liquid 38 rises above the level of the switch. The switch 62a is electrically coupled to an electronic control means 64 which is adapted to issue an audio and/or visual alarm, indicating a potential overflow of the liquid 38 within reservoir 36, in response to a signal from the switch 62a. In a similar manner, float switches 62b and 62c are adapted to detect; i.e., became activated, when and if the level of liquid 38 falls to levels corresponding to their positions within the tube of switch assembly 52. By electrically coupling switches 62b and 62c to control means 64, the former may issue audio and/or visual alarms to indicated (i) that the level of liquid 38 has fallen to a dangerously low level inside reservoir 36, and (ii) that reservoir 36 is practically empty. In the latter case, control means 64 may be adapted to automatically shut down the system to prevent damage to the heat exchangers and pumping means.

The present invention also includes temperature and pressure control means comprising (i) temperature control valve 70 serially coupled in conduit 30a (i.e., in line with respect to the main flow circuit); (ii) by-pass conduit 72 coupling the inlet side 28 of air preheat exchanger 22 with reservoir 38; (iii) pressure control valve 74 serially coupled in conduit 72 (i.e., in line with respect to the by-pass flow circuit); (iv) an optional excess heat disposal coil 76 coupled across conduit 72 by means of control valve assembly 78; and (v) temperature sensing means (e.g., thermocouple transducers) 80a, 80b, and 80c located near the outlet side 26 of waste heat recovery exchanger 20, the outlet side 32 of air preheat exchanger 22 and the inlet side of pumping means 40 respectively. Temperature transducers 80 are electrically connected to an electronic temperature controller within control means 64. The temperature controller may be implemented by a bias bridge circuit which is responsive to any out of balance condition due to changes in the signal level from any of the input temperature transducers 80. Such bias bridge circuits are well known in the electronics control art. The temperature controller, in turn, generates a control signal which is electrically connected to a solenoid 71 which controls the position of temperature control valve 70, thereby closing the temperature control loop. In operation, the foregoing temperature and pressure control means maintains a desired equilibrium condition with respect to the temperatures at the three points monitored, the flow rate of the heat transfer liquid 38 and the amount of waste heat recovered, all of which are interdependent parameters. Under the desired equilibrium condition, sufficient waste heat is recovered from the exhaust gases to enhance the efficiency of the process, but not so much as to reduce the temperature of the exhaust gases to a point where condensation begins. Further, the temperature of the heat transfer liquid 38 at the outlet 26 of waste heat recovery exchanger 20 is maintained below a temperature at which flashing and/or evaporation may occur, while the temperature at the outlet 32 of air preheat exchanger 22 is kept above a temperature at which the liquid may freeze or become excessively viscous. Likewise, pumping means 40 is protected from excessively hot liquid 38 entering its inlet side by the temperature and pressure control means.

Primary temperature control is effected by the position of temperature control valve 70. The setting of temperature control valve is a variable factor which, together with the fixed factors of heat exchanger size, conduit size, pumping capacity, etc., determines the rate of flow of heat transfer liquid 38 through the main flow circuit. The rate of flow of liquid 38, in turn, determines the amount of waste heat recovered and the temperatures of the liquid at various points in the flow circuit. As the rate of flow increases, more waste heat is recovered, but the temperature of the liquid 38 decreases. Likewise, the converse is true; i.e., as the rate of flow decreases, the temperature of liquid 38 increases. The desired temperatures at the critical points of the flow circuit are maintained by setting the temperature controller so that the correction signal is nulled; i.e., the bridge is balanced, when the desired temperatures are sensed. This leaves the temperature valve 70 at a position at which the flow rate of heat transfer liquid 38 corresponds to the attainment of the desired temperatures. If the temperature at any of the monitored points shifts one way or the other, the controller senses the imbalance and responds by issuing an appropriate control signal to the solenoid 71 of the temperature control valve 70.

The by-pass flow circuit, comprised of waste heat recovery exchanger 20, conduits 24 and 72, pressure control valve 74, reservoir 36 and conduits 30b and 30c, provides an automatic pressure control means. A pressure sensing transducer 84 is coupled to conduit 72 in the vicinity of pressure control valve 74 and to a conventional control solenoid 85 which controls the position of said valve. When the pressure in the main flow circuit increases, the increase is detected by transducer 84. The latter responds by opening the pressure control valve 74, thereby increasing the rate of flow through the by-pass flow circuit and reducing the pressure in the main circuit. Conversely, pressure control valve 84 is increasingly closed when the pressure sensed decreases. In this manner, a desired pressure equilibrium is maintained. A secondary and optional temperature control means is provided by excess heat disposal coil 76. By the adjustment of valve assembly 78, a portion of the heat transfer liquid 38 flowing through the by-pass circuit may be passed through exchanger 76, thereby dissipating some heat to the atmosphere or some other suitable heat sink.

One additional safety feature is also contemplated by this invention. It comprises the combination of valve 90 and nitrogen gas pressure tank 92, coupled to the inlet side 34 of waste heat recovery exchanger 20 by conduit 94. The manual or automatic operation of valve 92 permits nitrogen gas, under pressure, to be introduced into the main flow circuit in the direction of flow. Thus, in the event of a pump failure or an interruption in the flow of heat transfer liquid 38 for any reason, the nitrogen can be injected to force the liquid 38 to flow out of the waste heat recovery exchanger 20, thereby preventing it from heating up to an excessively high (and potentially dangerous) temperature and/or pressure.

Although this invention has been disclosed and described with reference to a particular embodiment, the principles involved are susceptible of other applications which will be apparent to persons skilled in the art. Thus, it should be understood that various changes in form, detail and application of the present invention may be made without departing from the spirit and scope of the invention.

We claim:

1. A waste heat recovery apparatus installed in a processing system, the latter having of an exhaust stack through which exhaust gases are discharged, and a recipient fluid which can be beneficially heated at a point remote from said exhaust stack, said waste heat recovery system comprising:
   (a) a first heat exchanger disposed within said exhaust stack such that said exhaust gases flow across its surfaces;
   (b) a second heat exchanger disposed at said point remote from said exhaust stack such that said recipient fluid flows across its surfaces, the inlet of said second heat exchanger being in communication with the outlet of said first heat exchanger and the outlet of said second heat exchanger being in communication with the inlet of said first heat exchanger through conduit means, so as to define a closed flow circuit;
   (c) a heat transfer fluid adapted to circulate within said closed flow circuit;
   (d) a reservoir for storing said heat transfer fluid in communication with said closed flow circuit;
   (e) means for forcing said heat transfer fluid to circulate through said closed flow circuit, said forcing means being disposed serially within said closed flow circuit;
   (f) means for controlling the temperature of said heat transfer fluid at at least two critical points within said closed flow circuit, said temperature control means being coupled thereto and comprising: (i) at least two temperature transducers, each located at a point which the temperature of said heat transfer fluid is critical; (ii) a temperature controller responsive to an out-of-balance condition due to a change in the desired temperature of said fluid at any of said critical points, said temperature controller being electrically coupled to said transducers and adapted to output an electrical control signal when said out-of-balance condition is detected; and (iii) a solenoid operated temperature control valve disposed serially in said closed flow circuit, the position of said valve determining the rate of flow of said heat transfer fluid therein, said solenoid being electrically coupled to the output of said controller so that the position of said valve is controlled by said control signal;
   (g) means for controlling the pressure of said fluid, said pressure control means being in communication with said closed flow circuit and comprising:
   (i) a by-pass flow circuit comprising conduit means coupled between the inlet of said second heat exchanger and said reservoir; (ii) a solenoid-operated pressure control valve disposed serially in said by-pass flow circuit, the position of said valve determining the rate of flow of said heat transfer fluid therein; and (iii) a pressure transducer located at a point within said by-pass flow circuit, said pressure transducer being adapted to output a second electrical control signal responsive to the pressure detected, said second control signal being electrically coupled to said solenoid;
   whereby, said heat transfer fluid absorbs waste heat from said exhaust gases as they pass through said first heat exchanger and releases said recovered waste heat to said recipient fluid as it passes through said second heat exchanger, the temperatures of said fluid at said critical points being maintained substantially within their desired ranges by said temperature controller and temperature valve adjusting the rate of flow of said fluid; and said temperature control valve adjusting the rate of flow of said fluid; and the pressure of said fluid being maintained substantially within its desired range by said pressure transducer and pressure control valve adjusting the rate of flow of said fluid through said by-pass flow circuit.

2. The apparatus of claim 1 wherein said first and second heat exchangers are finned coils.

3. The apparatus of claim 1 wherein said heat transfer fluid is selected from the group consisting of o-dichlorobenzene, diphenyl-diphenyloxide eutectic, di-aryl ethers, tri-aryl ethers, hydrogenated terphenyls, polychlorinated biphenyl, polyphenyl ether, alkyl-aromatic petroleum oil, alaphatic petroleum oil and pure lubrication oil.

4. The apparatus of claim 1 having in addition thereto a limit switch assembly comprising (i) a vertically disposed tube coupled to said reservoir and adapted to receive and contain said heat transfer fluid; (ii) first, second, and third electrical float switches disposed at first, second, and third levels respectively within said tube, said first float switch being adapted to be electrically activated when and if the level of said fluid rises above said first level, said second and third float switches being adapted to be electrically activated when and if the level of said fluid falls below said second and third levels respectively; and (v) means responsive to the electrical activation of any of said float switches and being adapted to issuing an alarm in response thereto.

5. The apparatus of claim 1 wherein said temperature controller is an electronic, balanced bridge circuit.

6. The apparatus of claim 1 having in addition thereto a third heat exchanger in valved communication with said by-pass flow circuit, said third heat exchanger being adapted to release heat from said heat transfer fluid to a heat sink.

7. The apparatus of claim 1 having in addition thereto a nitrogen gas purge means comprising a nitrogen gas tank coupled to said closed flow circuit at the inlet side of said first heat exchanger through a valve means, said valve means enabling the injection of nitrogen gas into said flow circuit in the direction of flow in the event of an interruption in the flow of said heat transfer fluid.

8. The apparatus of claim 1 wherein one each of said temperature transducers is located near the outlet of said first heat exchanger, near the outlet of said second heat exchanger, and near the inlet of said means for forcing said heat transfer fluid to circulate through said closed flow circuit.

9. A method of recovering waste heat in a processing system, the latter having of an exhaust stack through which exhaust gases are discharged, and heating a recipient fluid at a point remote from said exhaust stack, the method comprising the steps of:
   (a) disposing a first heat exchanger within said exhaust stack such that said exhaust gasses will flow across its surfaces;
   (b) disposing a second heat exchanger at said point remote from said exhaust stack such that said recipient fluid will flow across its surfaces;
   (c) coupling the inlet of said second heat exchanger in communication with the outlet of said first heat exchanger, and the outlet of said second heat exchanger in communication with the inlet of said first heat exchanger through conduit means, so as to define a closed circuit;
   (d) providing a reservoir for storing heat transfer fluid in communication with said closed flow circuit;
   (e) providing means for forcing heat transfer fluid to circulate through said closed flow circuit, said forcing means being disposed serially within said closed flow circuit;
   (f) providing a heat transfer fluid in said closed flow circuit and said reservoir;
   (g) controlling the temperature of said heat transfer fluid at least two critical points within said closed flow circuit by (i) sensing at least two temperatures, each at a point at which the temperature of said heat transfer fluid is critical; (ii) monitoring the temperatures sensed to detect an out-of-balance condition due to a change in the desired temperature of said fluid at any of said critical points and to provide a control signal in response thereto; and (iii) controlling a solenoid operated temperature control valve disposed serially in said closed flow circuit with said control signal so that the position of said valve determines the rate of flow of said heat transfer fluid therein;
   (h) controlling the pressure of said fluid by: (i) providing a by-pass flow circuit comprising conduit means between the inlet of said second heat exchanger and said reservoir; (ii) providing a solenoid-operated pressure control valve serially in said by-pass flow circuit, the position of said valve determining the rate of flow of said heat transfer fluid therein; (iii) providing a pressure transducer at a point within said by-pass flow circuit, and (iv) controlling said solenoid operated pressure control valve by the output of said pressure transducer;
whereby, said heat transfer fluid will absorb waste heat from said exhaust gases as they pass through said first heat exchanger and release said recovered waste heat to said recipient fluid as it passes through said second heat exchanger, with the temperatures of said fluid at said critical points being maintained substantially within their desired ranges by said temperature controller and temperature valve adjusting the rate of flow of said fluid; and said temperature control valve adjusting the rate of flow of said fluid; and with the pressure of said fluid being maintained substantially within its desired range by said pressure transducer and pressure control valve adjusting the rate of flow of said fluid through said by-pass flow circuit.

10. The method of claim 9 wherein one each of said temperatures is sensed near the outlet of said first heat exchanger, near the outlet of said second heat exchanger, and near the inlet of said means for forcing said heat transfer fluid to circulate through said closed flow circuit.

11. The method of claim 9 wherein said first and second heat exchangers are finned coils.

12. The method of claim 9 wherein said heat transfer fluid provided is selected from the group consisting of o-dichlorobenzene, diphenyl-diphenyloxide eutectic, di-aryl ethers, tri-aryl ethers, hydrogenated terphenyls, polychlorinated biphenyl, polyphenyl ether, alkyl-aromatic petroleum oil, alaphatic petroleum oil and pure lubrication oil.

13. The method of claim 9, and providing in addition thereto a limit switch assembly comprising (i) a vertically disposed tube coupled to said reservoir and adapted to receive and contain said heat transfer fluid; (ii) first, second, and third electrical float switches disposed at first, second, and third levels respectively within said tube, said first float switch being adapted to be electrically activated when and if the level of said fluid rises above said first level, said second and third float switches being adapted to be electrically activated when and if the level of said fluid falls below said second and third levels respectively; and (iii) providing an alarm responsive to the electrical activation of any of said float switches.

14. The method of claim 9 wherein said temperatures are monitored by an electronic, balanced bridge circuit.

15. The method of claim 9, and providing in addition thereto a third heat exchanger in valved communication with said by-pass flow circuit, to release heat from said heat transfer fluid to a heat sink.

16. The method of claim 9, and providing in addition thereto a nitrogen gas purge means comprising a nitrogen gas tank coupled to said closed flow circuit at the inlet side of said first exchanger through a valve means, and controlling said valve means to enable the injection of nitrogen gas into said flow circuit in the direction of flow in the event of an interruption in the flow of said heat transfer fluid.

* * * * *